United States Patent
Fano

(10) Patent No.: US 7,873,590 B2
(45) Date of Patent: Jan. 18, 2011

(54) METHODS AND SYSTEMS FOR A DECISION CLIENT

(75) Inventor: Axel Fano, Vienna (AT)

(73) Assignee: rit EDV-Consulting GmgH, Vienna (AT)

( * ) Notice: Subject to any disclaimer, the term of this patent is extended or adjusted under 35 U.S.C. 154(b) by 557 days.

(21) Appl. No.: 11/934,648

(22) Filed: Nov. 2, 2007

(65) Prior Publication Data

US 2009/0119241 A1    May 7, 2009

(51) Int. Cl.
*G06F 17/00* (2006.01)
*G06N 5/02* (2006.01)

(52) U.S. Cl. ....................................... 706/47
(58) Field of Classification Search ............ 706/47
See application file for complete search history.

(56) References Cited

U.S. PATENT DOCUMENTS

| 6,151,582 | A | 11/2000 | Huang et al. |
| 6,332,155 | B1 | 12/2001 | Notani |
| 6,430,545 | B1 | 8/2002 | Honarvar et al. |
| 6,876,991 | B1 | 4/2005 | Owen |
| 6,954,757 | B2 | 10/2005 | Zargham et al. |
| 2003/0120956 | A1 | 6/2003 | Chiu |
| 2003/0195754 | A1 | 10/2003 | Ford et al. |
| 2005/0080817 | A1 | 4/2005 | Janow |
| 2006/0004619 | A1 | 1/2006 | Matheson |
| 2008/0177593 | A1 * | 7/2008 | Clayton et al. ............. 705/7 |

FOREIGN PATENT DOCUMENTS

JP    2006092279 A    4/2006

* cited by examiner

*Primary Examiner*—Michael Holmes
(74) *Attorney, Agent, or Firm*—Sheppard Mullin Richter & Hampton LLP

(57) ABSTRACT

The present invention is directed to a decision client computer application providing a single point for making decisions in a company. The decision client may comprise a centralized tool to connect employees needing decisions on various aspects of their jobs to decision makers, such as managers. The users of the system can be identified by a digital signature. In one embodiment, when the client application receives a request for decision, it routes the request to the person responsible for the decision. Requests can automatically be passed to an alternative decision maker when an employee is out of the office.

20 Claims, 3 Drawing Sheets

METHODS AND SYSTEMS FOR A DECISION CLIENT

TECHNICAL FIELD

The present invention relates to methods and systems for facilitating decision making and more particularly, some embodiments relate to decision client applications.

DESCRIPTION OF THE RELATED ART

Managers in many organizations can be called upon to make decisions regarding business planning, employee issues, office space issues, office supplies, purchasing raw materials, etc. In some cases, a manager might be responsible for many decisions per day. This may make it difficult for the manager to keep track of all the decisions that need to be made, which can lead to a delay in making a decision, or a lack of any decision at all.

In some cases, it can be difficult to keep track of who made some of the various decisions. This can be especially true in large organizations. In other cases, it might be important to know who made a decision to, for example, evaluate the decision maker. It might also be important to know who made a decision so that the reasons behind the decision can be reconsidered if it becomes necessary to reevaluate the earlier decision. Additionally, it might be difficult to known the reasons why a decision was made if the decision maker is not know.

In may also be difficult to determine who should make various decisions, for example, when a manager in charge of some aspect of the business is away from the office. In some cases, an employee might have difficulty determining who should approve a request while the manager is away.

Decisions can be made in a variety of ways. For example, an employee might ask a manager by calling the manager on the telephone or sending an email. Decisions can also be made by creating a written request. The written request can, for example, be stored in a "signature folder" for review by a manager responsible for making the decision.

Each of these solutions can have various problems. For example, an email account can contain many different messages, some that require a decision and many others that might not require a decision. This might make it more difficult for a manager to keep track of decisions that need to be made. Similarly, it might be difficult to keep track phone calls and voice mails. Additionally, a large number of written request in a signature folder might each have to be forwarded to a different assistant manager in the absence of the manager who usually makes such decisions. While decisions can be made using each of these methods, it may, in some cases, be preferable if the process was automated in some way so that fewer resources are expended to make decisions. For example, a more automated system might allow more decisions to be made by fewer managers, or allow decisions to be made more easily and/or quickly in the absence of a manager.

BRIEF SUMMARY OF EMBODIMENTS OF THE INVENTION

According to one embodiment of the invention, a decision client computer application provides a single point for making decisions in a company. This decision client may be a centralized tool to connect employees needing decisions on various aspects of their jobs to decision makers, such as their managers. In some cases the decision client can improve the speed of making decisions, improve efficiency in making decisions, improve routing of requests in the absence of various decision makers, etc. It will be understood that this will vary from implementation to implementation and for different circumstances within a decision making entity, such as a management team within a corporation.

Various people in a company might use the decision client computer application, including without limitation, (i) people responsible for operational decisions such as office supple requests, vacation requests, proposals, etc., and (ii) people responsible for strategic decisions such as making or buying products, buying other companies, budget decisions, etc. In one embodiment, the client may consist of a personal computer software program and a card reader for digital signatures, wherein the users of the system can be identified by the digital signature. It will be understood by those of skill in the art, however, that other user authentication systems and methods in addition to or instead of digital signatures may be used by the client software.

The client can be connected to an enterprise application. Examples of enterprise applications include, e.g., SAP, Oracle Apps, Navision, etc. In this way, the client may be integrated with other applications. In one embodiment, when the client application receives a request for decision, it routes the request to the person responsible for the decision. The person responsible for the decision may receive various requests for decision for various company employees. These requests can be presented to the decision maker. In one embodiment, if a decision is not made within a predetermined period it can be routed to that employee's supervisor so that the supervisor can make the decision. In this way, decisions can be made when an employee is away from the office, for example, when an employee is on vacation. In another embodiment, a decision maker may set her account to indicate that she is out of the office. Requests can automatically be passed to an alternative decision maker when an employee is out of the office.

In another embodiment, a request for decision can consist of questions and possible answers. It will be understood that, in some cases, a request for decision can be a question that does not include predetermined possible answers. Accordingly, the person responsible for the decision might be required to determine various options and select from among those options. In some cases questions might require a "yes" or "no" answer, rather than more complicated response.

In yet another embodiment, the questions and possible answers might be defined in a meta-dictionary on a server. The questions and answers can be mapped with information that allow the request for decision to be created and the answer to the request for decision to be transmitted back to the requestor. Some embodiments of the invention allow for further processing, for example, continued workflow in an ERP system. Additional information (e.g., documents, reports, etc.) can be attached to the request. In one example, a requester might request that a contract be approved. The person approving the contract will probably want to review the contract. Accordingly, the requester can attach the contract to the request for approval. Additionally, in one embodiment, the approver might also digitally sign the contract in addition to approving within the client software, for example, so that a party outside the company, and thus probably outside the decision software system, can receive a digitally signed contract.

According to a further embodiment of the invention, the client can lead a user through each request for decision. Some decisions might be made automatically or semi-automatically based on a set of rules. For example, a manager might create a rule for office supply requests that approves all office supply requests under $200.00. This rule may automatically approve the request. In another embodiment, the approval might be delayed to allow the manager the opportunity to decide. After some period of time, if the manager has not made a decision, a request may be approve or denied based on a rule. For example, automatic approval of a request for office supplies might be delayed for one business day. If the manager does not approve or deny the request during that day the request may then be approved or denied based on any rule that is in place. For example, using the rule above, office supply requests under $200 would then automatically be approved, while office supply requests over $200 might either be automatically denied after 1 business day or required to wait for the manager's approval. In some embodiments a decision may be automatically rerouted or delegated to another decision maker. This decision maker could be the original decision makers supervisor or some other employee that has been delegated the authority to make various decisions.

In one embodiment, a "wizard" may be programmed into the client software to simplify the creation of rules. In another embodiment, a manager might use a "decision-to-go" function that will allow decisions to be made when the manager is away from the office. For example, decisions might be made using software to the client over a mobile telephone, PDA, or other mobile electronic device. In a further embodiment, an internet website might allow a decisions to be made while a manager is away from the office.

In one embodiment decisions can be authenticated using a digital signature. In some cases, digital signatures or other authentication systems and methods can be used to sign additional documents that might be attached to a decision. For example, an employee might ask for an approval of a proposal. Internally the approval might be given using the client software. The proposal might, however, require an electronic signature to communicate this approval outside the company.

The systems and methods described herein may be used to facilitate a manager making decisions. Additionally, after a decision is made, it can be sent back to the original requester. Further, the decision can be tracked using the client software. In this way the systems and methods described herein can be used to determine what decisions were made, when, why, and by whom. This may allow for more transparent decision making. A list of outstanding decisions that need to be made can be tracked such that these outstanding decisions can be escalated to another decision maker if necessary. In some cases multiple approvals may be required. For example, a decision may "travel" up a chain of command and need to be approved at each level. The systems and methods described herein may, in some embodiments, facilitate these approvals. Additionally, they may allow for tracking of what decisions were made, when, why, and by whom for the chain of approvals. Chain approvals might also incorporate automatic rerouting, delegation, automatic decision making, waiting periods, etc.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
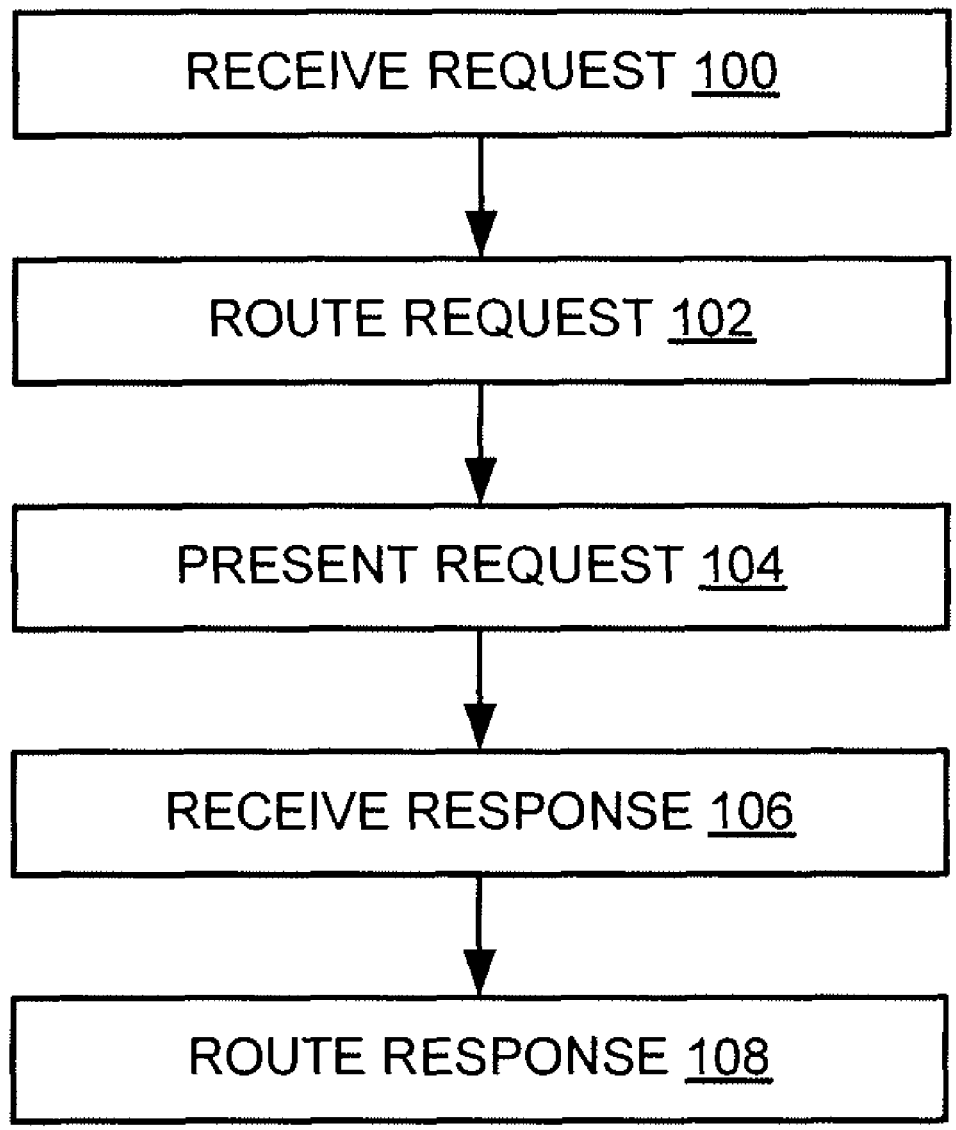
FIG. 1 is a flowchart illustrating an example method for processing requests in accordance with the systems and methods described herein.

The figures are not intended to be exhaustive or to limit the invention to the precise form disclosed. It should be understood that the invention may be practiced with modification and alteration, and that the invention be limited only by the claims and the equivalents thereof.

DETAILED DESCRIPTION OF THE EMBODIMENTS OF THE INVENTION

In one embodiment a decision making client computer application may be used to facilitate making decisions. The decision making client may receive requests for decisions and route those requests for decision to a correct decision maker. In some cases, if more than one decision maker's approval is required, the request can be routed to each of the decision makers. The request for decision can then be presented to the decision maker or makers. The software may also keep track of which decision maker or makers have approved the decision. After the decision has been made, the client can receive the response to the request for decision from the decision maker and route the response to the original requester. In one embodiment, the decision making can be automated. In another embodiment, the decision making can be made while away from the office by, for example, providing a decision maker with various information needed to make a decision. For example, the information can be stored on the decision makers lap top computer prior to leaving the office or transmitted to a wireless device that is being used by the decision maker. In a further embodiment, the request can automatically be routed to another decision maker in the absence of a first decision maker.

Before describing the invention in detail, it is useful to describe an example environment with which the invention might be implemented. In an exemplary implementation, the invention is implemented using a decision client computer application. The software might run on a computer, e.g., a personal computer, minicomputer, mainframe, etc. The computer might include various input devices, such as a keyboard, mouse, trackball, etc.; various output devices, such as a monitor, printer, etc.; and various storage devices, such as ROM, RAM, disk drives, magnetic disks, magnetic tape drives, etc. Additionally, it will be understood by one of ordinary skill in the art that the computer may a desktop computer, laptop computer, etc.

In some embodiments of the invention, a decision client computer application can run on a computer network. For example, the software can run on one or more computers that are networked together using an intranet, the internet, or some other computer network. A network of computers can facilitate the transmissions of requests which might be sent from a requester to a decision maker over the network. Other embodiments might use, for example, a single shared computer. Yet another embodiment might use computers, wireless devices, etc. to send and receive decision requests and decisions.

In one embodiment a central processor, such as a server, may be used. The server may be connected to terminals, other computers, wireless devices, etc. As discussed above, these connections can be made using various wired connections, wireless connections, or both. The central processor may be use to handle incoming requests and for sending out responses. In some embodiments the server may run tracking and enterprise applications. In some cases by using a server the systems and methods described herein might be better integrated with the tracking and enterprise applications used within, e.g., given organization. It will be understood by one of skill in the art, however, that decision client computer applications can be integrated with tracking and enterprise applications that might run on other platforms such as multiple electronic devices, for example, multiple personal computers operating over a computer network.

Having thus described an example environment where a decision client software can run on a computer, we will now discuss various example embodiments of methods and systems for physical hierarchy configuration. These methods and systems may include a decision client computer application that may provide a single point for making decisions in a company. This decision client may be a centralized tool to connect employees needing decisions on various aspects of their jobs to decision makers, such as their managers. The users of the system can be identified by the digital signature. In one embodiment, when the client application receives a request for decision it routes it to the person responsible for the decision. Requests can automatically be passed to an alternative decision maker when an employee is out of the office.

FIG. 1 is a flowchart illustrating an example method for processing requests in accordance with the systems and methods described herein. In step 100, a request for decision is received. The request for decision may be generated by a company employee for example. This employee might need to order office supplies, have a vacation request, propose a budget for the company, or just about any other request that might occur within a company or other type of organization.

A system implementing the method described with respect to FIG. 1 might receive a request from a user that is using, for example, a computer. In one embodiment, a requester might input a request into a desktop PC, a laptop, or other computing device. The computing device may be configured to run decision client software. This software might be run locally on the computing device or over a network. For example, in some embodiments, as discussed above, a central processor, such as a server, may be used. The server may handle incoming requests and send outgoing responses to other computers, e.g., a response may be sent to a requestor's computer so that the requestor knows if a request has been approved, rejected, etc. The server might also contain software that may be run over the network on a user's computer, e.g., software that allows an employee to make or approve requests.

In an embodiment featuring a system implementing the method described with respect to FIG. 1, the request might be received from a wireless handheld device. In this way, a requester might make requests for decisions while away from the office, or away from his or her computer. According to an alternative embodiment, decisions might be made using a wireless handheld device instead of rather than in addition to a computer.

In step 102 the request is routed to a decision maker. The request can be routed to a decision maker over a computer network such as an Ethernet network, or the internet. In another embodiment the request can be routed to a user over a wireless network. The requests might be transmitted wirelessly to a decision making system or might be synchronized later, for example, when the wireless communication device is not within range of a wireless communication system. Synchronization can occur automatically, or might require action by the user. Additionally, synchronization might be performed wirelessly, or might require that the wireless device be connected to a computer using, e.g., a "cradle" that allows the device to be connected to the computer using a wired connection.

In step 104 the request can be presented to the decision maker, for example using an electronic device. The electronic device might be a computer such as a desktop or laptop computer. In another embodiment, the electronic device might be a wireless handheld device. In this way, the decision maker may make decisions when he is away from his desktop or laptop computer. Alternatively, decisions might be made using a wireless handheld device instead of rather than in addition to a computer.

The decisions might be transmitted wirelessly back to the decision making system or might be synchronized later, for example, when the wireless communication device is not within range of a wireless communication system. Synchronization can occur automatically, or might require action by the user. Additionally, synchronization might be performed wirelessly, or might require that the wireless device be connected to a computer using, e.g., a "cradle" that allows the device to be connected to the computer using a wired connection.

After the decision maker is presented with a request, she can determine an answer. Alternatively, some decisions might be made automatically or semi-automatically based on a set of rules. For example, a manager might create a rule for office supply requests that approves all office supply requests under $200.00. This rule may automatically approve the request. In some cases a decision maker, such as a manger might make a decision regarding a request.

An automatic or semi-automatic decision might be made in various devices. For example, a decision making electronic device such as a personal computer, PDA, etc. might store or have access to a set of rules and automatically reply to the requester. Accordingly, in this example, the initial decision receiving electronic device may be the decision making electronic device. Alternatively, a network control device or other electronic device, such as a decision maker's personal computer, PDA, etc. may be an automatic decision making device. Accordingly the personal computer, PDA, etc. may store or have access to a set of rules and automatically reply to the requester. In some embodiments, even when a decision is automatically made it may still be routed to a decision makers electronic device, for example, so that the decision maker might overrode the rule based decision.

In step 106 the system may receive a response to a request. The response may be received by the system using, e.g., a computer, wireless handheld device, etc. The response is then routed back to the original requestor in step 108. In this way, the original requestor can be informed about her request and may then proceed based on the decision. The response might be received by the original requestor using a computer, wireless device, etc.

The electronic device used to transmit request, receive requests, transmit responses, or receive responses can be a computer or wireless handheld device. In many cases, when a computer is used to transmit requests, receive requests, transmit responses, or receive responses, the computer can be a computer attached to a company network. In one embodiment, a user can connect to a decision client system using, e.g., the internet. For example, a user might log into the company network over the internet, or other network. In another embodiment, a user might access the client software over a web site. For example, similarly to how a user might access a web based email system.

In another embodiment, the approval might be delayed to allow the manager the opportunity to decide. After some period of time, if the manager has not made a decision, a request may be approve or denied based on a rule. For example, automatic approval of a request for office supplies might be delayed for one business day. If the manager does not approve or deny the request during that day the request may then be approved or denied based on any rule that is in place. For example, using the rule above, office supply requests under $200 would then automatically be approved, while office supply requests over $200 might either be automatically denied after 1 business day or the requester might be required to wait for the manager's approval.

In one embodiment, a "wizard" may be programmed into the client software to simplify the creation of rules. In another embodiment, a manager might use a "decision-to-go" function that will allow decisions to be made when the manager is away from the office. For example, decisions might be made using software to connect to the client over a mobile telephone, PDA, or other mobile electronic device. In a further embodiment, an internet website might allow decisions to be made while a manager is away from the office.

In some embodiments the systems and methods described herein may be used to decide requests for additional money. For example, a company employing a decision client system might undertake a project. In some cases the project might experience cost overruns or might need additional money for other reasons, for example, the scope of the project might be expanded. Additional budget might be required to complete the project. A decision client system may be used to route requests to certain managers within the company. These managers might decide to approve the additional funding, to disapprove the additional funding, to cancel the project, to request additional information, etc.

Figure 4:
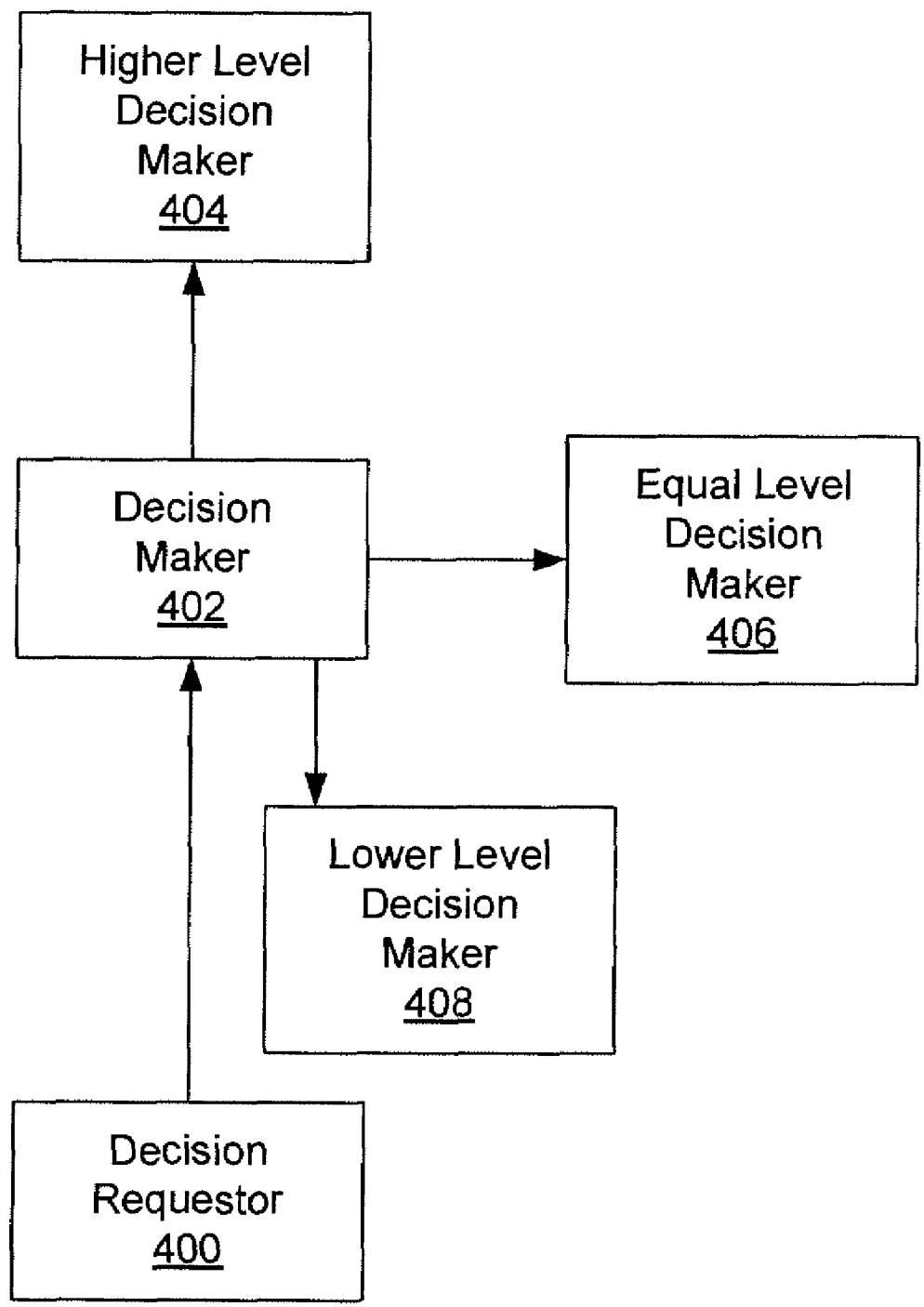
FIG. 4 is a diagram illustrating an example company hierarchy that can be used for making decisions in accordance with the systems and methods described herein.

The systems and methods described herein may also incorporate automatic rerouting and delegation, which is described in more detail with respect to FIG. 4. In some embodiments automatic decision making may be used, e.g., based on a rule or rules. Automatic decision making may include waiting periods, for example, to allow a decision maker time to make a decision prior to automatically making the decision based on the rule. Some embodiments may allow for decision transparency by allowing people to easily determine who made what decisions, why these decisions were made, etc. For example, the system may allow a person to input reasons why a decision is approved. The system might also track which approvals were made by a person and which were made automatically based on a rule. For example, so that if an incorrect decision is made the rule causing that decision might be re-evaluated.

Figure 2:
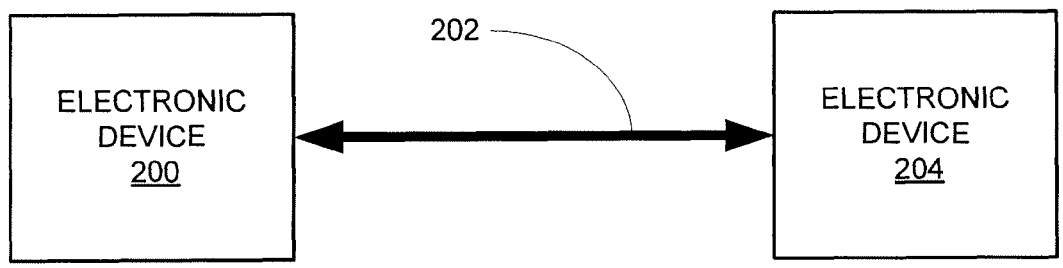
FIG. 2 is a diagram illustrating an example system for processing requests in accordance with the systems and methods described herein.

FIG. 2 is a diagram illustrating an example system for processing requests in accordance with the systems and methods described herein. A system implementing the method described with respect to FIG. 1 might send and receive requests using, for example, an electronic device 200. The electronic device 200 might be a computer. In one embodiment, a requester might input a request into a desktop PC, a laptop, or other computing device. The computing device may be configured to run decision client software. This software might be run locally on the computing device or over a network. For example, as discussed above, software that allows requests to be processed might be run by a user's computer from a server over a network.

Alternatively, in another embodiment, electronic device 200 might be a wireless handheld device. By using a wireless handheld device, a requestor might make requests for decision while away from the office, or away from his or her computer. As discussed above, in one embodiment, decisions might be made using a wireless handheld device instead of rather than in addition to a computer.

Requests can be routed to a decision maker over a network 202. Network 202 can be a computer network such as an Ethernet network, or the internet. In another embodiment, network 202 can be a wireless network. For example, requests might be transmitted wirelessly to a decision making system. In such a case the decision maker might receive the requests on, e.g., a wireless communication device. In one embodiment, network 202 may also be some combination of wired and wireless network.

Another electronic device 204 can present a request to a decision maker. Similarly to electronic device 200, electronic device 204 might be a computer such as a desktop or laptop computer, or in another embodiment, the electronic device might be a wireless handheld device. Network 202 might also be used to transmitted decisions back to a requester.

Figure 3:
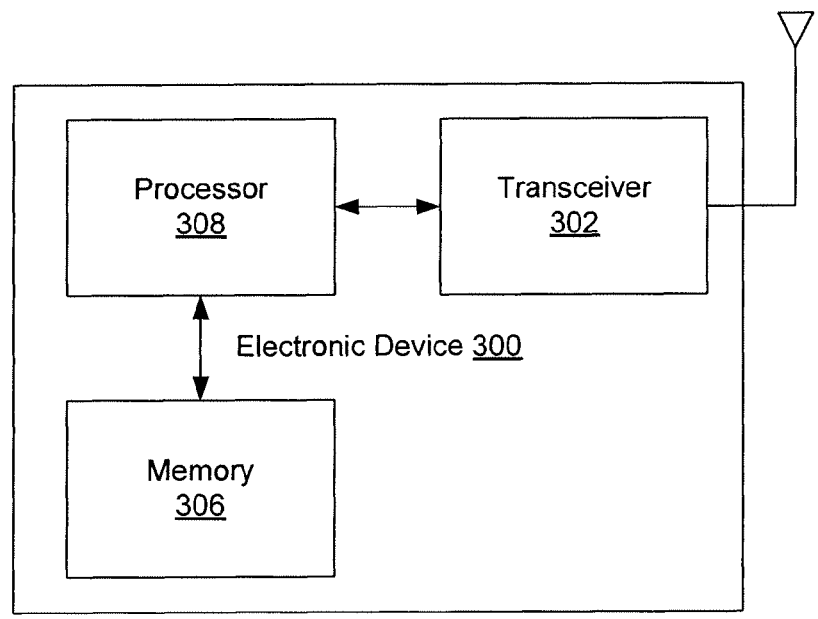
FIG. 3 is diagram illustrating an example electronic device for processing requests in accordance with the systems and methods described herein.

FIG. 3 is diagram illustrating an example electronic device for processing requests in accordance with the systems and methods described herein. Electronic device 300 might be, for example, a computer or wireless handheld device. A wireless handheld device may include a transceiver 302. The transceiver maybe used for transmitting and receiving wireless transmissions using antenna 304. The transmissions may include requests, decisions, etc.

While the example electronic device 300 of FIG. 3 illustrates wireless transmissions using transceiver 302 and antenna 304, it will be understood by one of skill in the art that other electronic devices might be used with the system and methods described herein. In some cases these devices might use wired transmission systems such as a wired computer network or other wired communication technology. For example, the devices used may be a personal computer and requests and decisions may be transmitted or received using a computer network (wired, wireless or both).

Electronic device 300 may also include a memory 306 that might store instructions or data. Instructions may be executed using a processor 308. These instructions can include instructions for implementing the systems and methods described herein. Transceiver 302 can also be coupled to a processor 308. In this way, processor 308 can send and receive requests for decision or decisions.

FIG. 4 is a diagram illustrating an example company hierarchy that can be used for making decisions in accordance with the systems and methods described herein. A decision requestor 400 may need to have a decision made. For example, requestor 400 might need to have his or her manager decide if the company should produce a new product. Generally, this request can be routed to a decision maker 402 such as the requestor's manager, for example. If the decision maker 402 is unavailable, the decision request might be sent to a higher level decision maker 404. This can happen when, for example, decision maker 402 fails to reply to the request for decision in a timely manner. The time will vary from implementation to implementation. It might be hours, days, weeks, or perhaps even longer depending on the type of request, the structure of the company, etc. This might also vary from company to company. In one embodiment, the time delay may be set by the users of the client decision software.

In some embodiments, however, decision making can be automatic or semi-automatic based on rules. The request might be accepted or rejected immediately or after some predetermined period, e.g., so the manager has time to reply. If the manager does not reply the decision may be sent to a higher level, as discussed with respect to FIG. 4. In other embodiments, however, based on e.g., predefined rules, the decision might be made without the approval of, e.g., the requestor's manager. For example, by using automatic or semi-automatic decision making as discussed further above. It will be understood that in some cases certain decisions might not lend themselves to automatic or semi-automatic decision making. For example, particularly sensitive decisions. Accordingly, the method described with respect to FIG. 4 may be used. Additionally, some combination of these methods may be used.

In one embodiment, a decision maker 402 may set an out of office status. When decision maker 402 is out of office the decision may go directly to higher decision maker 406. Alternatively, the request might go immediately to both decision maker 402 and higher decision maker 404. It will be understood by those of skill in the art that a number of different implementations are possible without departing from the scope of the invention.

In one embodiment a decision request might go to another decision maker 406 that is considered to be the same "level" as decision maker 402. For example, decision maker 402 and equal level decision maker 406 might both be mid-level managers in a corporation.

In another embodiment, a decision maker might delegate decision making responsibility to one or more lower level employees such as lower level decision maker 408. This may allow decision maker 402 to delegate reasonability between multiple employees such that the employee with the most experience with some aspect of the companies operation can make decisions in that area.

In one embodiment, a decision maker might delegate different decision making tasks between different decision making tasks between decision makers 404, 406, and 408. For example, the client decision software may be customized to direct decision requests in just about any different way that the company using the software might desire, including for example, automatically directing decisions to different decision makers 404, 406, 408, when one or more decision makers 402 are away from the office.

In some embodiments, decision requests can be presented in a hierarchical way. In some cases this might allow for easier navigation through what may be a large number of requests. For example, in some embodiments requests may be split into "incoming", "outgoing", "decided", and any additional folders that may be added by the user, e.g., "my folder." In this way, requests can be organized to allow a user to find them when needed.

In some embodiments, income requests might further be divided into additional subcategories. For example, "outstanding balance" for requests for some sort of payment, "finances" for other financially related requests and "personal" for employee personal requests. Examples of personal requests may include "holiday requests," e.g., days off, such as holiday, vacation, etc. Other employee requests might include overtime requests, leaves of absence, etc. These categories may generally be customized by the user. Outgoing and decided requests as well as other folders may also be further subdivided.

In some embodiments, by selecting a request, a decision window may be opened. The decision window may include various information relating to the request. For example, a holiday or vacation request might include some or all of the following: the requestor's name, the subject of the request, e.g., "vacation", the dates of the vacation, the number of vacation days the requestor has left, perhaps before or after the vacation has been taken, or maybe both, total vacation days used, e.g., before, after, or during the vacation.

In some cases, a manager will have to reject a request. In that case a window can open that allows the manager to state reasons for the rejection. For example, if the request is for a vacation, perhaps too many other employees are off at the same time, and accordingly the manager has declined the request. Almost any other type of requests can also be made using the systems and methods described herein.

Some embodiments of the systems and methods described herein may allow for chain of command approvals. For example, a request may be sent to a first decision maker. Upon approval of the first decision maker the request may be sent to a second decision maker. This can be repeated until one of the decision makers denies the request or a decision maker high enough in the chain of command approves the request.

Chain approvals may also allow for automatic rerouting or delegation, such as the methods described with respect to FIG. 4. For example, when a decision maker 402 is unavailable the decision may be sent to a higher level decision maker 404, an equal level decision maker 406, or a lower level decision maker 408. In a case where the lower level decision maker 408 has already approved this decision an equal level decision maker 406 or a higher level decision maker 404 might be selected. For example, if the decision will eventually be routed to the higher level decision maker 404 an unavailable decision maker 402 may be automatically bypassed in favor of the higher level decision maker 404. In some embodiments waiting periods that allow a decision maker time to make the decision may be used. If a decision needs to be made quickly, however, these waiting periods might be bypassed, e.g., when a decision maker 402 is unavailable.

In some embodiments chain approvals might also implement automatic decision making, e.g., based on rules. For example, a decision might be automatically approved at one level based on a rule and then routed up the next level in the chain. In some cases the last approval might be required to be made by an actual person, rather than based on a rule.

These systems and methods may also allow for transparency into the decision making process. For example, who made what decisions can be tracked as a decision moves up a chain of command. The system might also track which approvals were made by a person and which were made automatically based on a rule. For example, so that if an incorrect decision is made the rule causing that decision might be re-evaluated.

It will be understood by those of skill in the art that the hierarchical user interface discussed above is only an example. The systems and methods described herein may be presented on computer or other electronic devices using many different user interfaces.

The systems and methods described herein have been described with respect to computers and wireless devices communicating over networks, both wired and wireless. In one embodiment, a decision making client may run on a single computer or other electronic device. This computer or electronic device can be accessed by both decision requestors and decision makers. Each user can have an account. This account may contain requests generated by the user, decisions that the user has to make, and answers to requests generated by the user.

It will be understood by those of ordinary skill in the art that the systems and methods described may be implemented in hardware, software, or some combination of hardware and software. Additionally, the software might run on one or more processors, microprocessors, controllers, microcontrollers, etc.

As used herein, the term module might describe a given unit of functionality that may be performed in accordance with one or more embodiments of the present invention. As used herein, a module might be implemented utilizing any form of hardware, software, or a combination thereof. For example, one or more processors, controllers, ASICs, PLAs, logical components or other mechanisms might be implemented to make up a module. In one implementation, the various modules described herein might be implemented as discrete modules or the functions and features described may be shared in part or in total among one or more modules. In other words, as would be apparent to one of ordinary skill in the art after reading this description, the various features and functionality described herein may be implemented in any given application and may be implemented in one or more separate or shared modules in various combinations and permutations. Even though various features or elements of functionality may be individually described or claimed as separate modules, one of ordinary skill in the art will understand that these features and functionality may be shared among one or more common software and hardware elements, and such description shall not require or imply that separate hardware or software components are used to implement such features or functionality.

While various embodiments of the present invention have been described above, it should be understood that they have been presented by way of example only, and not of limitation. Likewise, the various diagrams may depict an example architectural or other configuration for the invention, which is done to aid in understanding the features and functionality that might be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. A method of electronically tracking decisions comprising:

receiving a request for decision from a requestor using an electronic system;

automatically making the decision based on a rule when a rule pertaining to the decision is available;

routing the request to a first decision maker using the electronic system when the rule is unavailable;

presenting the request to the first decision maker when the rule is unavailable;

automatically routing the request to a second decision maker using the electronic system when the first decision maker is unavailable;

receiving a response to the request; and routing the response to the request to the requestor using the electronic system.

2. The method of claim 1, further comprising downloading the request to a personal computer.

3. The method of claim 2, wherein a determination that a decision maker is unavailable is based on the decision maker setting an unavailable status.

4. The method of claim 2, wherein a determination that a decision maker is unavailable is based on the decision maker not making a decision in a predetermined time period.

5. The method of claim 1, further comprising tracking if a decision has been made by a person or based on a rule.

6. The method of claim 1, wherein the response to the request comprises entering a password to authenticate the response.

7. The method of claim 1, further comprising routing a request up a chain of command.

8. The method of claim 1, further comprising tracking why a decision has been made.

9. The method of claim 1, further comprising transmitting the request for decision to a wireless communication device.

10. The method of claim 1, further comprising allowing access to the request for decision using a web site.

11. A decision making system comprising:

a decision receiving electronic device configured to receive a request for decision from a requestor, an automatic decision making device configured to automatically make the decision based on a rule when a rule pertaining to the decision is available, a network control device configured to:

route the request to a first decision maker when the rule is unavailable, automatically route the request to another decision maker then the first decision maker is unavailable, and route a response from the first or second decision maker back to the requestor;

a first electronic device configured to present the request to the first decision maker when the rule is unavailable and receive a response to the request from the first decision maker; and a second electronic device configured to present the request to the second decision maker and receive a response to the request from the second decision maker.

12. The system of claim 11, wherein the first and second electronic devices comprise wireless communication devices.

13. The system of claim 11, wherein the decision receiving electronic device comprises a wireless communication device.

14. The system of claim 11, wherein the first and second electronic device comprise computers.

15. The system of claim 11, wherein the decision receiving electronic device comprises a computer.

16. The system of claim 11, wherein the system tracks when a decision has been made by a person or based on a rule.

17. The system of claim 11, wherein the second electronic device automatically issues a decision on the request based on a predetermined set of rules.

18. An electronic device comprising:

a transceiver configured to transmit and receive requests from requestors over a network that is configured to route requests for decision to decision makers and route responses to the requests back to the requesters;

a memory configured to store instructions;

a processor, coupled to the memory and the transceiver configured to receive requests for decision and present the requests for decision to a decision maker, to receive responses to requests from other decision makers, automatically making the decision based on a rule when a rule pertaining to the decision is available, and automatically route a request for decision to another electronic device based on a status flag set in the electronic device that indicates the user of the device is unavailable.

19. The electronic device of claim 18, wherein the electronic device comprises a computer.

20. The electronic device of claim 18, wherein the electronic device comprises a wireless communication device.

* * * * *